(12) United States Patent
Rupanagunta et al.

(10) Patent No.: US 9,886,196 B2
(45) Date of Patent: Feb. 6, 2018

(54) METHOD AND SYSTEM FOR EFFICIENT COMMON PROCESSING IN MEMORY DEVICE CONTROLLERS

(71) Applicant: HGST Netherlands B.V., Amsterdamn (NL)

(72) Inventors: Sriram Rupanagunta, Bangalore (IN); Ashish Singhai, Los Altos, CA (US); Sandeep Sharma, Karnataka (IN); Srikant Sadasivam, Bangalore (IN); Krishanth Skandakumaran, Los Gatos, CA (US); George Moussa, Dublin, CA (US); Rajendra Prasad Mishra, Santa Clara, CA (US); Kenneth Alan Okin, San Jose, CA (US)

(73) Assignee: Western Digital Technologies, Inc., San Jose, CA (US)

( * ) Notice: Subject to any disclaimer, the term of this patent is extended or adjusted under 35 U.S.C. 154(b) by 0 days.

(21) Appl. No.: 14/992,353

(22) Filed: Jan. 11, 2016

(65) Prior Publication Data

US 2017/0115887 A1    Apr. 27, 2017

Related U.S. Application Data

(60) Provisional application No. 62/244,662, filed on Oct. 21, 2015, provisional application No. 62/244,624, filed on Oct. 21, 2015.

(51) Int. Cl.
*G06F 3/06* (2006.01)
*G06F 13/42* (2006.01)

(52) U.S. Cl.
CPC .......... *G06F 3/0607* (2013.01); *G06F 3/0656* (2013.01); *G06F 3/0659* (2013.01); *G06F 3/0688* (2013.01); *G06F 13/4282* (2013.01)

(58) Field of Classification Search
None
See application file for complete search history.

(56) References Cited

U.S. PATENT DOCUMENTS 8,260,973 B2   9/2012   Asnaashari et al.
8,341,374 B2   12/2012  Kwon et al.
(Continued)

OTHER PUBLICATIONS

Universal NVM Express Controller (UNEX) http://mobiveil.com/downloads/unex-pb-altera.pdf, 2013.
(Continued)

*Primary Examiner* — Kevin Verbrugge
(74) *Attorney, Agent, or Firm* — McDermott Will & Emery LLP (57) ABSTRACT

Embodiments of the present invention are operable to efficiently schedule memory device commands, such as flash memory device commands, while taking into account the interdependencies of processing such commands. As such embodiments of the present invention order commands to make sure that data is written and read from memory devices in a coherent fashion using command groups. Commands within such command groups are scheduled concurrently or in parallel. In this fashion, embodiments of the present invention promote efficient execution of memory device commands while maintaining any required arbitrary ordering requirements.

20 Claims, 9 Drawing Sheets

(56) References Cited

U.S. PATENT DOCUMENTS

| | | |
|---|---|---|
| 8,489,803 B2 | 7/2013 | Intrater |
| 8,725,931 B1 | 5/2014 | Kang |
| 8,756,454 B2 | 6/2014 | Cagno et al. |
| 9,021,178 B2 | 4/2015 | Guda |
| 9,158,729 B1 | 10/2015 | Joyce et al. |
| 9,389,805 B2 | 7/2016 | Cohen et al. |
| 2004/0221101 A1 | 11/2004 | Voorhees et al. |
| 2008/0229079 A1 | 9/2008 | Flynn et al. |
| 2011/0072209 A1* | 3/2011 | Lund ................ G06F 13/14 711/114 |
| 2011/0131375 A1 | 6/2011 | Noeldner et al. |
| 2013/0086311 A1 | 4/2013 | Huang et al. |
| 2013/0254455 A1 | 9/2013 | Shim et al. |
| 2014/0059270 A1 | 2/2014 | Zaltsman et al. |
| 2014/0181365 A1 | 6/2014 | Fanning et al. |
| 2014/0289462 A9* | 9/2014 | Malwankar ........... G06F 3/0611 711/114 |
| 2014/0331001 A1 | 11/2014 | Liu et al. |
| 2015/0006663 A1 | 1/2015 | Huang |
| 2015/0074298 A1 | 3/2015 | Kanamorie et al. |
| 2015/0186074 A1 | 7/2015 | Benisty et al. |
| 2017/0115888 A1 | 4/2017 | Rupanagunta et al. |

OTHER PUBLICATIONS

Configurable Command and Data Sequencer for a Flash Controller https://priorart.ip.com/IPCOM/000225861, Aug. 12, 2015.
High Performance Solution for PCIe SSD http://www.ip-maker.com/index.php?option=com_phocadownload&view=category&download=34:nvme_product_overview&id=6.nvm, 2014.

* cited by examiner

| Memory Address | Operation ID | Device | Command to be Performed | Operation Type | Assigned Group ID |
|---|---|---|---|---|---|
| ... | ... | ... | ... | ... | ... |
| Memory Location 210-1 | Operation ID 215-1 | Memory Device 305-1 | Generated Command Expression 204-3 | Read | Group ID 216-1 |
| Memory Location 210-2 | Operation ID 215-2 | Memory Device 305-1 | Generated Command Expression 204-4 | Write | Group ID 216-2 |
| Memory Location 210-3 | Operation ID 215-3 | Memory Device 305-2 | Generated Command Expression 204-5 | Read | Group ID 216-1 |
| Memory Location 210-4 | Operation ID 215-4 | Memory Device 305-2 | Generated Command Expression 204-6 | Write | Group ID 216-2 |
| ... | ... | ... | ... | ... | ... |
| Memory Location 210-13 | Operation ID 215-13 | Memory Device 305-3 | Generated Command Expression 204-13 | Read | Group ID 216-1 |
| Memory Location 210-14 | Operation ID 215-14 | Memory Device 305-3 | Generated Command Expression 204-14 | Write | Group ID 216-2 |
| Memory Location 210-15 | Operation ID 215-15 | Memory Device 305-4 | Generated Command Expression 204-15 | Read | Group ID 216-1 |
| Memory Location 210-16 | Operation ID 215-16 | Memory Device 305-4 | Generated Command Expression 204-16 | Write | Group ID 216-2 |
| ... | ... | ... | ... | ... | ... |

Data Structure 205-2

Figure 1F

| Data Structure 205-3 | | | | |
|---|---|---|---|---|
| Memory Address | Assigned Group ID | Device | Command to be Performed | Operation Type |
| Memory Location 210-21 | Group ID 216-1 | Memory Device 305-1 | Generated Command Expression 204-3 | Read |
| Memory Location 210-22 | Group ID 216-1 | Memory Device 305-2 | Generated Command Expression 204-5 | Read |
| Memory Location 210-23 | Group ID 216-1 | Memory Device 305-3 | Generated Command Expression 204-13 | Read |
| Memory Location 210-24 | Group ID 216-1 | Memory Device 305-4 | Generated Command Expression 204-15 | Read |
| . . . | . . . | . . . | . . . | . . . |
| Memory Location 210-33 | Group ID 216-2 | Memory Device 305-1 | Generated Command Expression 204-4 | Write |
| Memory Location 210-34 | Group ID 216-2 | Memory Device 305-2 | Generated Command Expression 204-6 | Write |
| Memory Location 210-35 | Group ID 216-2 | Memory Device 305-3 | Generated Command Expression 204-14 | Write |
| Memory Location 210-36 | Group ID 216-2 | Memory Device 305-4 | Generated Command Expression 204-16 | Write |
| . . . | . . . | . . . | . . . | . . . |

| Data Structure 205-4 | | | | | |
|---|---|---|---|---|---|
| Memory Address | Assigned Group ID | Device | Command to be Performed | Operation Type | . . . |
| Memory Location 210-21 | Group ID 216-1 | Memory Device 305-1 | Generated Command Expression 204-3 | Read | . . . |
| Memory Location 210-22 | Group ID 216-1 | Memory Device 305-2 | Generated Command Expression 204-5 | Read | . . . |
| Memory Location 210-23 | Group ID 216-1 | Memory Device 305-3 | Generated Command Expression 204-13 | Read | . . . |
| Memory Location 210-24 | Group ID 216-1 | Memory Device 305-4 | Generated Command Expression 204-15 | Read | . . . |
| . . . | . . . | . . . | . . . | . . . | . . . |

| Data Structure 205-N | | | | | |
|---|---|---|---|---|---|
| Memory Address | Assigned Group ID | Device | Command to be Performed | Operation Type | . . . |
| Memory Location 210-33 | Group ID 216-2 | Memory Device 305-1 | Generated Command Expression 204-4 | Write | . . . |
| Memory Location 210-34 | Group ID 216-2 | Memory Device 305-2 | Generated Command Expression 204-6 | Write | . . . |
| Memory Location 210-35 | Group ID 216-2 | Memory Device 305-3 | Generated Command Expression 204-14 | Write | . . . |
| Memory Location 210-36 | Group ID 216-2 | Memory Device 305-4 | Generated Command Expression 204-16 | Write | . . . |
| . . . | . . . | . . . | . . . | . . . | . . . |

METHOD AND SYSTEM FOR EFFICIENT COMMON PROCESSING IN MEMORY DEVICE CONTROLLERS

CROSS-REFERENCE TO RELATED APPLICATIONS

This application claims priority from U.S. Provisional Patent Application Ser. No. 62/244,662, filed Oct. 21, 2015 to Rupanagunta et al., entitled "EFFICIENT COMMON PROCESSING IN PCLe SSD CONTROLLERS" and is related to co-pending U.S. Utility patent application Ser. No. 14/992,701 entitled "METHOD AND SYSTEM FOR A COMMON PROCESSING FRAMEWORK FOR MEMORY DEVICE CONTROLLERS," filed on Jan. 11, 2016, which claims priority to U.S. Provisional Patent Application Ser. No. 62/244,624, filed Oct. 21, 2015 to Rupanagunta et al., entitled "COMMON PROCESSING FRAMEWORK FOR CONTROLLERS IN PCI SSDS." All of these references are incorporated herein by reference.

FIELD OF THE INVENTION

The present invention generally relates to the field of random-access memory (RAM) devices.

BACKGROUND OF THE INVENTION

Memory device controllers, such as PCI SSD controllers, generally operate in two different controller environments. The first environment is a host-based environment in which flash translation logic (FTL) resides in the host software driver and the controller hardware performs hardware functions. The second environment is an embedded processor environment in which the FTL resides in embedded CPUs on the controller.

As such, these controller environments sometimes require the use of standardized protocols to communicate memory device commands, such as NVMe or SCSI over PCIe (SOP). These controller environments may also be implemented in a manner that requires vendor-specific protocols (i.e., non-NVME or non-SOP protocols). As such, the software and hardware structures included in these controller environments must be properly configured in order to support these different types of protocols. Accordingly, many conventional memory device controller systems are often unable to process memory device commands in a manner that efficiently accounts for these differences.

Furthermore, conventional approaches often fail to efficiently schedule the processing of memory device commands. For instance, conventional approaches are often unable to account for any interdependencies related to the processing of memory device commands or handle the inherent temporal ordering of such commands in a coherent fashion.

SUMMARY OF THE INVENTION

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Embodiments of the present invention are operable to efficiently schedule memory device commands, such as flash memory device commands, while taking into account the interdependencies of processing such commands. As such, embodiments of the present invention order commands to make sure that data is written and read from memory devices in a coherent fashion using command groups. Commands within such command groups are scheduled concurrently or in parallel. In this fashion, embodiments of the present invention promote efficient execution of memory device commands while maintaining any required arbitrary ordering requirements.

BRIEF DESCRIPTION OF THE DRAWINGS

The accompanying drawings, which are incorporated in and form a part of this specification, and in which like numerals depict like elements, illustrate embodiments of the present disclosure and, together with the description, serve to explain the principles of the disclosure.

DETAILED DESCRIPTION

Reference will now be made in detail to the various embodiments of the present disclosure, examples of which are illustrated in the accompanying drawings. While described in conjunction with these embodiments, it will be understood that they are not intended to limit the disclosure to these embodiments. On the contrary, the disclosure is intended to cover alternatives, modifications, and equivalents which can be included within the spirit and scope of the disclosure as defined by the appended claims. Furthermore, in the following detailed description of the present disclosure, numerous specific details are set forth in order to provide a thorough understanding of the present disclosure. However, it will be understood that the present disclosure can be practiced without these specific details. In other instances, well-known methods, procedures, components, and circuits have not been described in detail so as not to unnecessarily obscure aspects of the present disclosure.

Figure 1A:
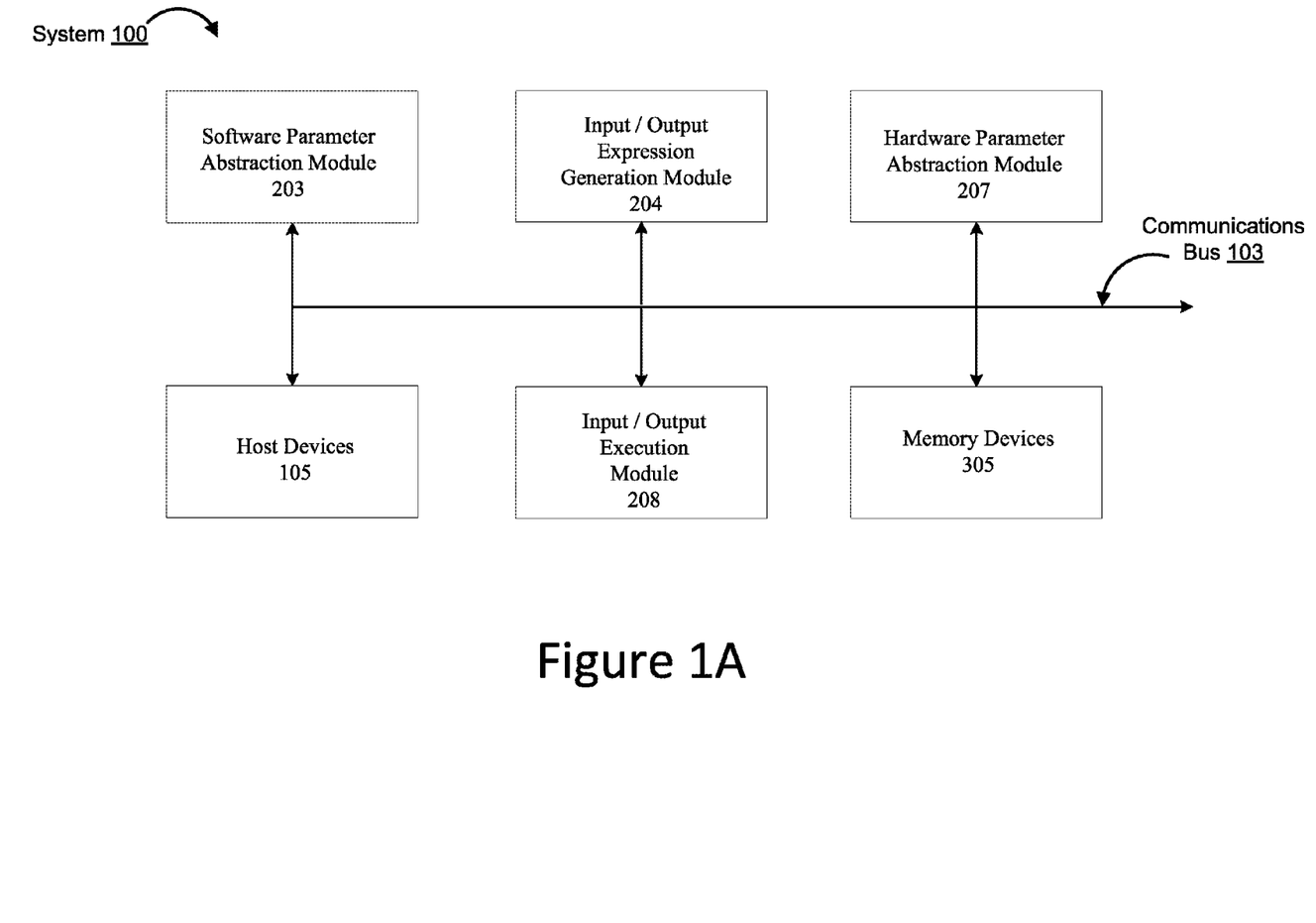
FIG. 1A is a block diagram depicting an exemplary data storage system capable of executing input/output commands expressed in different protocols using a single common format in accordance with embodiments of the present invention.

FIG. 1A is a block diagram depicting an exemplary data storage system capable of executing input/output commands expressed in different protocols using a single common format in accordance with embodiments of the present invention. As illustrated by the embodiment depicted in FIG. 1A, computer system 100 include software parameter abstraction module 203, input/output expression generation module 204, hardware parameter abstraction module 207, host devices 105, input/output execution module 208, and memory devices 305.

According to one embodiment, computer system 100 resides at the host device driver level and therefore receives input from applications operating within a user space level and/or kernel level. In this manner, computer system 100 generates corresponding I/O commands to enable a controller, such as a PCI SSD controller or flash controller, to operate in a mode that allows flash memory devices, such as memory devices 305, to store I/O commands for further processing. According to one embodiment, computer system 100 operates as firmware installed within a flash controller system and receives input from either a single host device or multiple host devices from host devices 105, thereby enabling the firmware to operate in a mode that allows flash memory devices to store I/O commands received from a host device for further processing.

As illustrated in FIG. 1A, computer system 100 sends and receives control bus signals and data bus signals through bus 103. Bus 103 may be a command/address bus or other communications bus (such as PCI). Computer system 100 receives control signals and/or data streams via several different channels capable of providing connectivity to host devices 105 so that these devices receive and/or provide various computer resources, including non-volatile memory devices such as memory devices 305. In this fashion, computer system 100 receives control signals over bus 103 from host devices 105 to access data buffered in memory devices 305.

Memory devices 305 include the functionality to act as data buffers which are shared by host devices 105 and/or a memory device controller. As such, host devices 105 and/or other devices perform read and/or write data procedures using communications bus 103. For instance, if a host device from host devices 100 seeks to perform read and/or write procedures involving memory devices 305, computer system 100 communicates the instructions sent by the requesting host device to a memory device within memory devices 305 to perform the requested procedure, where it is then stored for further processing.

Figure 1B:
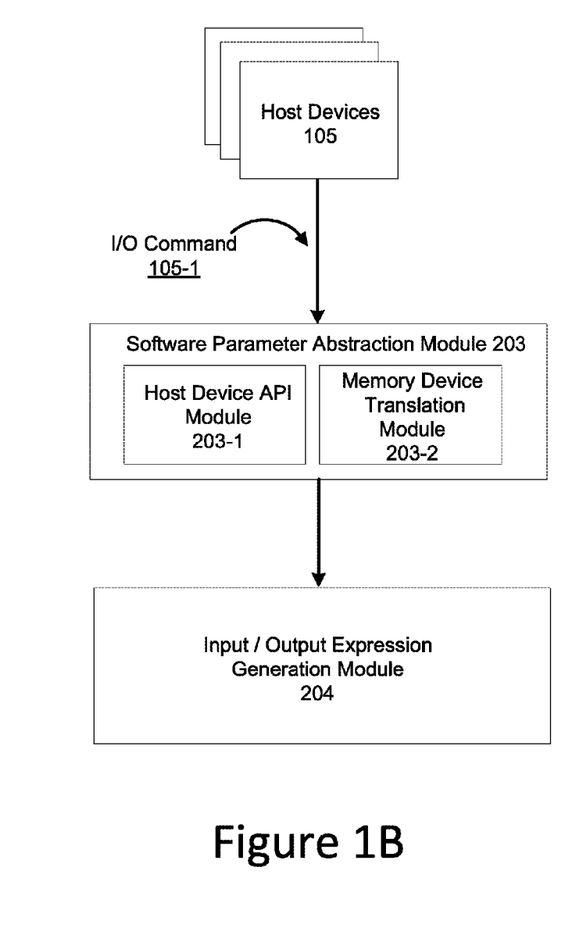
FIG. 1B is a block diagram depicting an exemplary input/output command front end engine for abstracting software data parameters from input/output commands expressed in different protocols in accordance with embodiments of the present invention.

FIG. 1B is a block diagram depicting an exemplary input/output command front end engine for abstracting software data parameters from input/output commands expressed in different protocols in accordance with embodiments of the present invention. With reference to the embodiment depicted in FIG. 1B, software abstraction module 203 includes the functionality to abstract parameter values from commands received from a host device from host devices 105.

For instance, with reference to the embodiment depicted in FIG. 1B, the software abstraction module 203 receives data path information from signals issued by a host device from host devices 105, such as I/O command 105-1. As such, the software abstraction module 203 stores I/O command 105-1 in one data buffer of a plurality of different data buffers resident on computer system 100 for further processing. I/O command 105-1 can be expressed in a vendor-specific protocol, such as Linux BIO commands, Windows SCSI CDB commands, etc., or a standard protocol, such as an NVMe command.

Software parameter abstraction module 203 includes the functionality to identify and translate portions of I/O command 105-1 into a common format or protocol adapted by computer system 100 for further processing by its components. In this fashion, software parameter abstraction module 203 is capable of abstracting parameters from I/O commands that are related to locations from which data should be read from, such as a flash memory location, how many data blocks should be read, where data should be written to, and the like. Accordingly, software parameter abstraction module 203 is configured to abstract all parameters included within the data path or a subset of those parameters included. Extracted parameters are then stored and subsequently communicated to other components of computer system 100 for farther processing.

Host device API module 203-1 includes the functionality to identity portions of I/O command 105-1 capable of being modified prior to or during execution, such as the location of where the data needs to be read from or written to. Additionally, host device API module 203-1 includes the functionality to modify portions of I/O command 105-1 through the interception of function calls. For instance, host device API module 203-1 utilizes computer-implemented linking procedures to intercept and/or redirect API calls associated with I/O command 105-1 to perform alternative procedures predetermined by computer system 100.

In this fashion, software parameter abstraction module 203 includes the functionality to include tables, such as address tables, capable of being dynamically modified based on the execution status of calls stored therein. In this manner, host device API module 203-1 alters or modifies I/O command 105-1 as it is being executed in real-time or prior to execution. In some embodiments, host device API module 203-1 includes a shim layer that is utilized for further processing by components of computer system 100.

Memory device translation module 203-2 includes the functionality to map block addresses, such as logical block addresses, received from a host device from host devices 105 to a physical address of a memory device from memory devices 305-1, 305-2, 305-3, and/or 305-4. Physical address identification procedures generally include page identifiers, block identifiers, sector identifiers, etc. As such, memory device translation module 203-2 determines where data should be read from a memory device. In this fashion, memory device translation module 203-2 utilizes data structures, such as tables, to assist in performing mapping procedures. The memory device translation module 203-2 also includes the functionality to pass generated mapping data as parameter values to other components of computer system 100, such as input/output expression generation module 204, for further processing.

Memory devices 305 are accessible by a host device from host devices 105 through procedures performed by memory device translation module 203-2. Mapping procedures performed by memory device translation module 203-2 allow host devices to map themselves into virtual memory space for a particular computer resource or I/O device.

For instance, host devices and/or other devices perform DMA (Direct Memory Access) read and/or write data procedures using memory devices 305-1, 305-2, 305-3, and/or 305-4 using the data generated by memory device translation module 203-2. In one embodiment, memory device translation module 203-2 includes the functionality to perform flash memory device translation procedures. Accordingly, software parameter extraction module 203 uses the functionality of host device API module 203-1 and/or memory device translation module 203-2 to identify and/or store parameter values included within portions of I/O command 105-1 for further processing by other components of computer system 100.

Figure 1C:
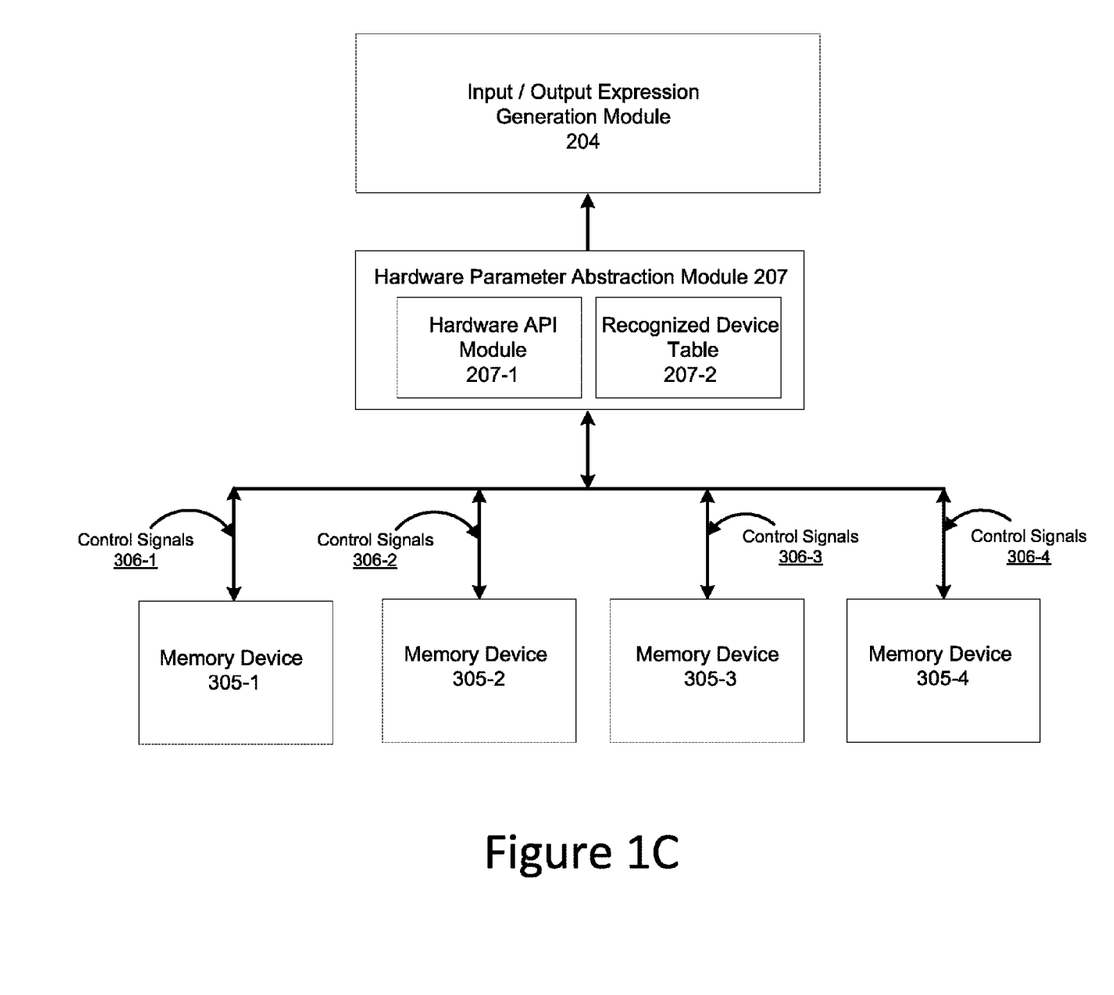
FIG. 1C is a block diagram depicting an exemplary front end engine for abstracting hardware data parameters from memory devices in accordance with embodiments of the present invention.

FIG. 1C is a block diagram depicting an exemplary front end engine for abstracting hardware data parameters from memory devices in accordance with embodiments of the present invention. With reference to the embodiment depicted in FIG. 1C, hardware abstraction parameter module 207 includes the functionality to allow computer system 100 to interact and control operation of hardware devices, such as memory devices 305-1, 305-2, 305-3, and/or 305-4. Hardware API module 207-1 includes the functionality to discover hardware devices, such as memory devices 305-1, 305-2, 305-3, and/or 305-4.

Upon recognition of memory devices 305-1, 305-2, 305-3, and/or 395-4, hardware API module 207-1 stores the identity of these devices within recognized device table 207-2. In this fashion, hardware parameter abstraction module 207 monitors and/or manages access to different memory devices included within computer system 100. According to one embodiment, memory devices 305-1, 305-2, 305-3, and/or 305-4 send respective control signals, such as control signals 306-1, 306-2, 306-3, and/or 306-4 respectively, to hardware API module 207-1 that communicate hardware specification and/or parameter data in response to signals sent therefrom or upon electronically coupling to computer system 100.

Control signals 306-1, 306-2, 306-3, and/or 306-4 are communicated to and from hardware API module 207-1 through object-based protocols. For instance, hardware API module 207-1 utilizes computer-implemented objects to represent memory devices 305-1, 305-2, 305-3, and/or 305-4, thereby allowing hardware API module 207-1 to track the respective execution statuses of memory devices 3051, 305-2, 305-3, and/or 305-4. Hardware API module 207-1 also includes the functionality to uniquely assign identifiers to memory devices 305-1, 305-2, 305-3, and/or 305-4 for tracking purposes.

Identifiers are generally in the form of memory addresses, bus addresses, or the like. In this manner, hardware parameter abstraction module 207 abstracts values related to memory device functionality through the use of APIs and gains access to device states. In some embodiments, signals received by hardware parameter abstraction module 207 from memory devices 305-1, 305-2, 305-3, and/or 305-4 are communicated thereto as system events.

Figure 1D:
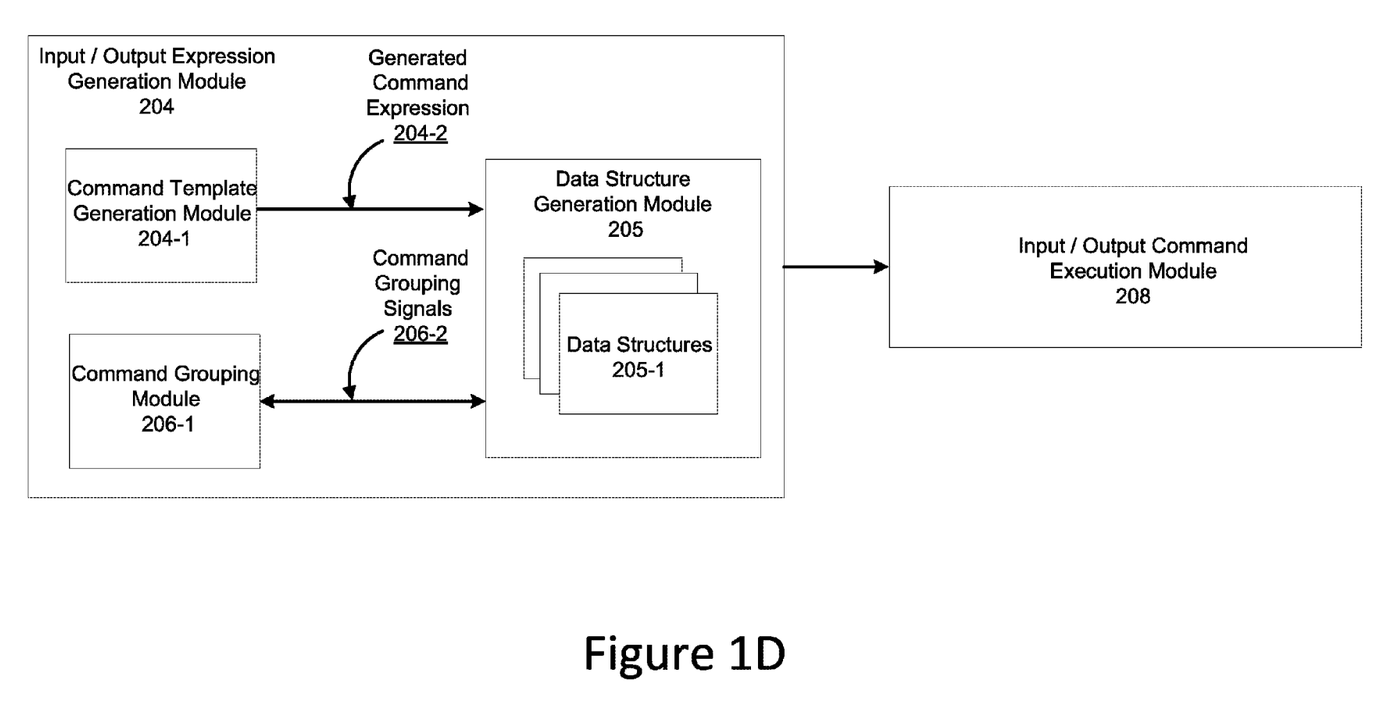
FIG. 1D is a block diagram depicting an exemplary input/output expression generation module capable of generating new input/output commands from input/output commands expressed in different protocols in accordance with embodiments of the present invention.

With reference to the embodiment depicted in FIG. 1D, input/output expression generation module 204 includes command template generation module 204-1, data structure generation module 205, and command grouping module 206-1. Command template generation module 204-1 includes the functionality to generate a new I/O command expression into a single common format that allows vendor-specific protocols (or non-NVMe formatted commands) and standardized formats (or NVMe formatted commands) to be harmonized and processed. For instance, command template generation module 204-1 generates an I/O command template and populates the template using parameters abstracted by software parameter abstraction module 203 and/or hardware parameter abstraction module 207.

In this fashion, command template generation module 204-1 generates a new I/O expression, such as generated command expression 204-2, using parameters typically associated with either a vendor-specific I/O protocol or a standardized protocol, such as NVMe commands. Generated command expression 204-2 includes parameters related to an I/O request associated with I/O command 105-1. I/O request parameters are placed in a predetermined section of generated command expression 204-2 designated specifically for I/O requests. Generated command expression 204-2 also includes prototype commands that modify memory references contained in I/O command 105-1.

In this manner, generated command expression 204-2 includes parameters related to DMA command packets. DMA packet parameters are placed in a predetermined section of generated command expression 204-2 designated specifically for DMA command packets. Additionally, generated command expression 204-2 includes command packet parameters related to instructions pertaining to flash device data transfers. Flash device data transfer parameters are placed in a predetermined section of generated command expression 204-2 designated specifically for DMA command packets.

Command template generation module 204-1 also includes the functionality to fill in missing details related to command packets. For instance, in one scenario, command template generation module 204-1 locates missing physical block identifiers in a read request using software parameter extraction module 203-1. Provided that all command packets are fully specified in generated command expression 204-2, generated command expression 204-2 is then stored within a data structure generated by data structure generation module 205 for further processing by system 100.

Data structure generation module 205 includes the functionality to create data structures, such as data structures 205-1, which includes one or more data structures. The number of data structures created by data structure generation module 205 can be predetermined or generated dynamically. Data structures 205-1 are in die form of databases, tables, queues, memory buffers, or the like. With reference to the embodiment depicted in FIG. 1E, data structure 205-2 is a data structure generated by data structure generation module 205. Data structure 205-2 stores a number of different command expressions generated by input/output expression generation module 204, such as generated command expressions 204-3, 204-4, 204-5, 204-6, 204-13, 204-14, 204-15, and/or 204-16. Generated command expressions 204-3, 204-4, 204-5, 204-6, 204-13, 204-14, 204-15, and/or 204-16 each express different I/O commands, such a "read" command or a "write" command issued by a host device.

In one scenario, generated command expressions 204-3, 204-4, 204-5, 204-6, 204-13, 204-14, 204-15, and/or 204-16 each express instructions related to non-continuous host device data that is stored in separate memory devices. For instance, with further reference to FIG. 1E, generated command expressions 204-3, 204-5, 204-13, and 204-15 each express instructions related to a "read" command to be performed on 1 MB of data. As such, portions of this data are stored in different memory devices, such as memory devices 305-1, 305-2, 305-3, and/or 305-4 so that the entire 1 MB of data does not need to be read in series. Thus, four different read operations are performed for each memory device to read 256 KB of data.

Figure 1E:
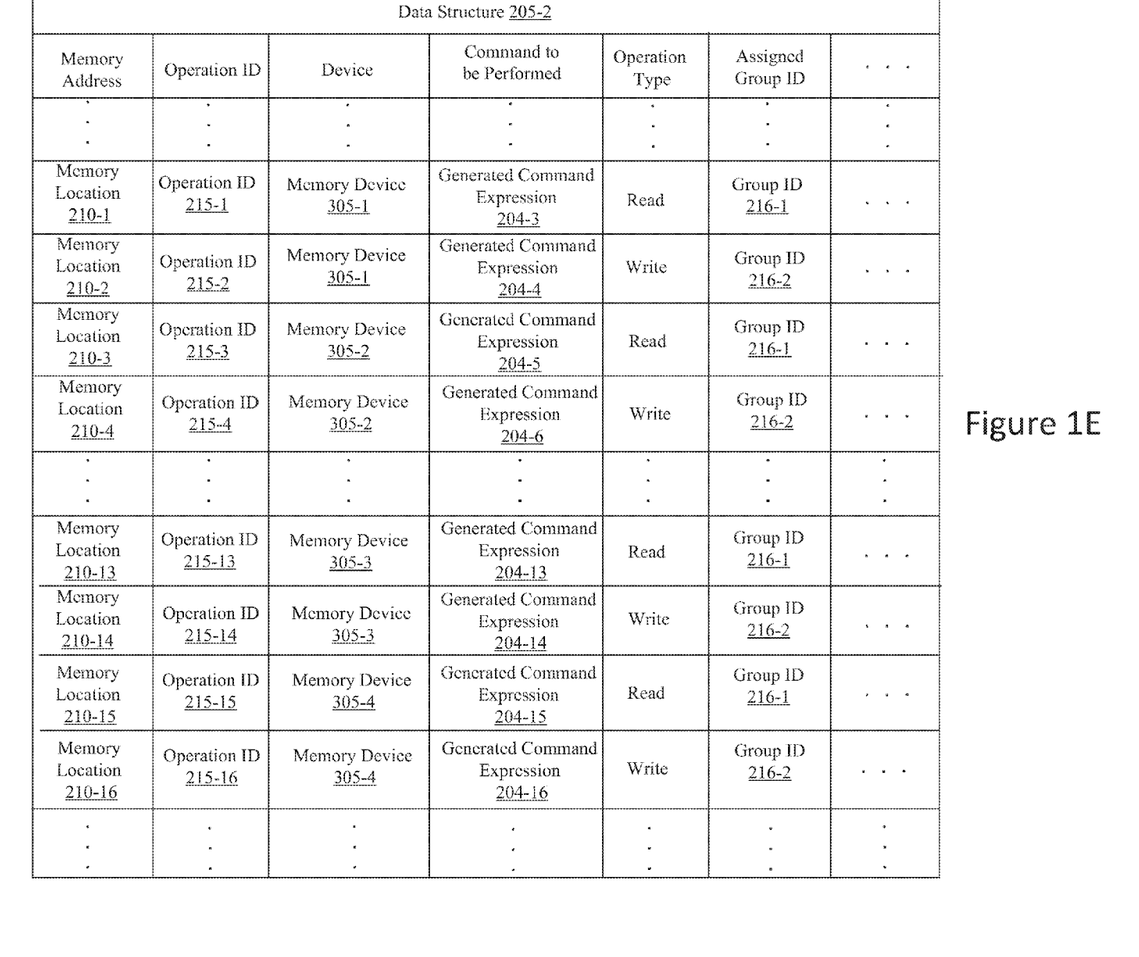
FIG. 1E depicts an exemplary data structure for storing newly generated input/output commands in accordance with embodiments of the present invention.

Generated command expressions 204-3, 204-4, 204-5, 204-6, 204-13, 204-14, 204-15, and/or 204-16 are each assigned to different memory address locations by data structure generation module 205, such as memory address locations 210-1, 210-2, 210-3, 210-4, 210-13, 210-14, 210-15, and 210-16, respectively. Generated command expressions 204-3, 204-4, 204-5, 204-6, 204-13, 204-14, 204-15, and/or 204-16 are each assigned different identifiers by data structure generation module 205, such as operation IDs 215-1, 215-2, 215-3, 215-4, 215-13, 215-14, 215-15, and 215-16 respectively. Operation IDs allow components of computer system 100, such as command grouping module 206-1, to track a respective execution status associated with generated command expressions. Operation IDs are created by data structure generation module 205 upon receipt of a generated command expression or upon command template generation module 204-1's generation of a generated command expression.

With further reference to the embodiment depicted in FIG. 1D, command grouping module 206-1 includes the functionality to identify entries stored in data structures generated by data structure generation module 205 and perform grouping procedures on them based on predetermined criteria. Command grouping module 206-1 also generates and assigns group identifiers to generated command expressions that are identified and grouped. For instance, as depicted in FIG. 1E, generated command expressions 204-3, 204-4, 204-5, 204-6, 204-13, 294-14, 204-15, and/or 204-16 each express different I/O commands, such a "read" command or a "write" command issued by a host device.

FIG. 1E depicts an exemplary data structure for storing newly generated input/output commands in accordance with embodiments of the present invention. For example, as illustrated in FIG. 1E, command grouping module 206-1 creates a group for "read" commands, such as group ID 216-1. Additionally, command grouping module 206-1 creates a group for "write" commands, such as group ID 216-2. In this fashion, command grouping module 206-1 creates multiple "command groups" that each contain a respective set of generated command expressions. Furthermore, command grouping module 206-1 includes the functionality to arrange command groups in an order for subsequent execution of their respective command sets.

For instance, command grouping module 206-1 groups generated command expressions 204-3, 204-4, 204-5, 204-6, 204-13, 204-14, 204-15, and/or 204-16 based on their respective command types. Depending on the size of an I/O command and/or the location of the memory device for which the I/O command is to be performed for, command grouping module 206-1 determines how many generated command expressions are included in a particular command group. Command groups include the same number of generated command expressions or have different numbers. In this fashion, generated command expressions associated with a particular command group are executed in a predetermined manner.

For example, with reference to the embodiment depicted in FIG. 1E, 1 MB of data are stored in different memory devices, such as memory devices 305-1, 305-2, 305-3, and/or 305-4, so that the entire 1 MB of data does not need to be read in series. Thus, operations 215-1, 215-3, 215-13, and 215-15 represent four different "read" operations that are performed for each memory device to read 256 KB of data. Similarly, operations 215-2, 215-5, 215-14, and 215-16 represent four different "write" operations to be performed for each memory device.

Figure 1F:
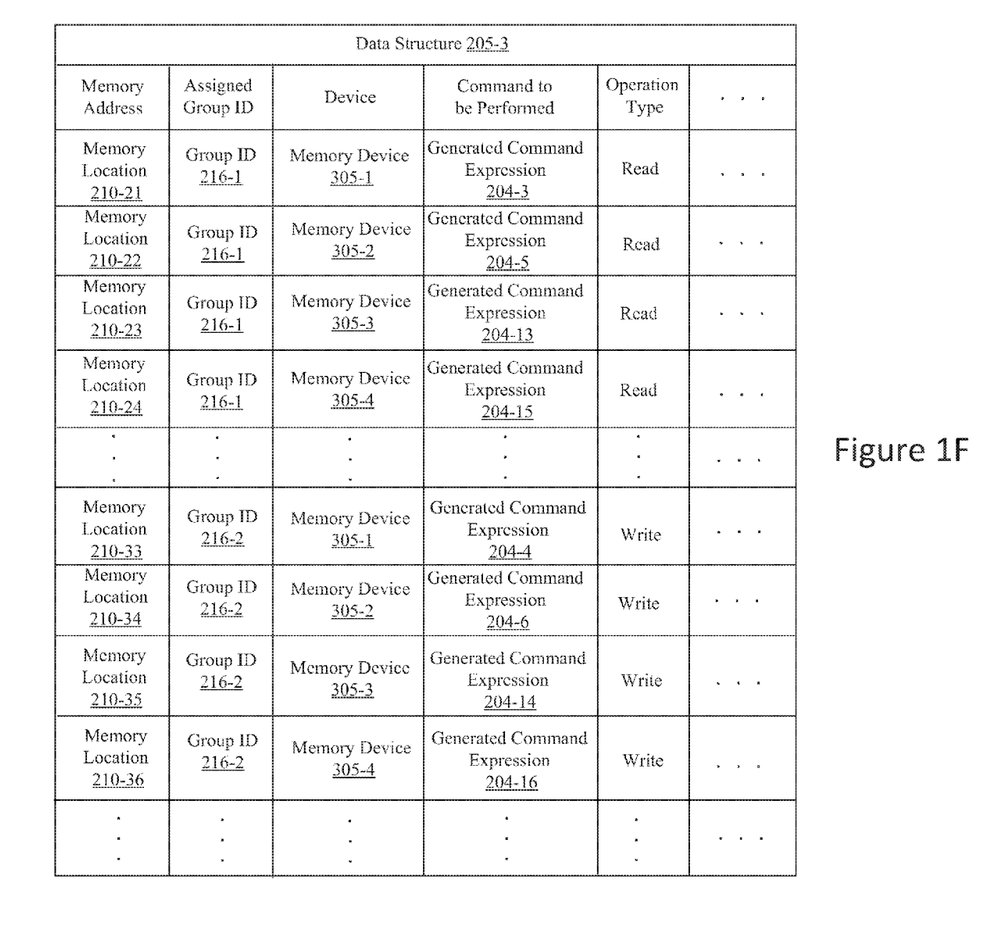
FIG. 1F depicts another exemplary data structure for storing newly generated input/output command expressions for grouped execution in accordance with embodiments of the present invention.

FIG. 1F depicts another exemplary data structure for storing newly generated input/output command expressions for grouped execution in accordance with embodiments of the present invention. Accordingly, with reference to the embodiment depicted in FIG. 1F, command grouping module 206-1 arranges the command group for "read" commands, such as command group 216-1, to include generated Command expressions 204-3, 204-5, 204-13, and 204-15. Additionally, command grouping module 206-1 arranges the command group for "write" commands, such as command group 216-2, to include generated command expressions 204-4, 204-6, 204-14, and 204-16.

The ability of command grouping module 206-1 to perform grouping procedures allows commands issued by a host device to have dependences and allow those dependencies to be specified in any order. For example, a host device may issue an I/O command to perform a "data integrity check" operation. These operations require that a prior operation be performed, such a "read" operation, and be fully executed prior to the performance of data integrity operations and that all data stored in a memory device be read.

Accordingly, in one embodiment, command grouping module 206-1 includes logic that specifies that a command group related to the performance of "read" operations be fully executed particular device before a data integrity operation is performed on the device. In this fashion, command grouping module 206-1 includes logic that allows for arbitrary rules pertaining to the order of generated command expression execution. Additionally, the grouping and/or arrangement of generated command expressions for execution are performed in an atomic manner, thereby allowing successive generated command expressions in a command group to be executed in the order they were placed without the insertion of any intermediate commands.

Furthermore, command grouping module 206-1 includes logic that allows generated command expressions to be executed in parallel. For instance, command grouping module 206-1 generates additional identifiers that specify which sets of generated command expressions need to be executed in parallel. The ability of command grouping module 206-1 to enable the execution of generated command expressions in parallel and/or include predetermined dependencies thereby reduces system latencies in general.

Figure 1G:
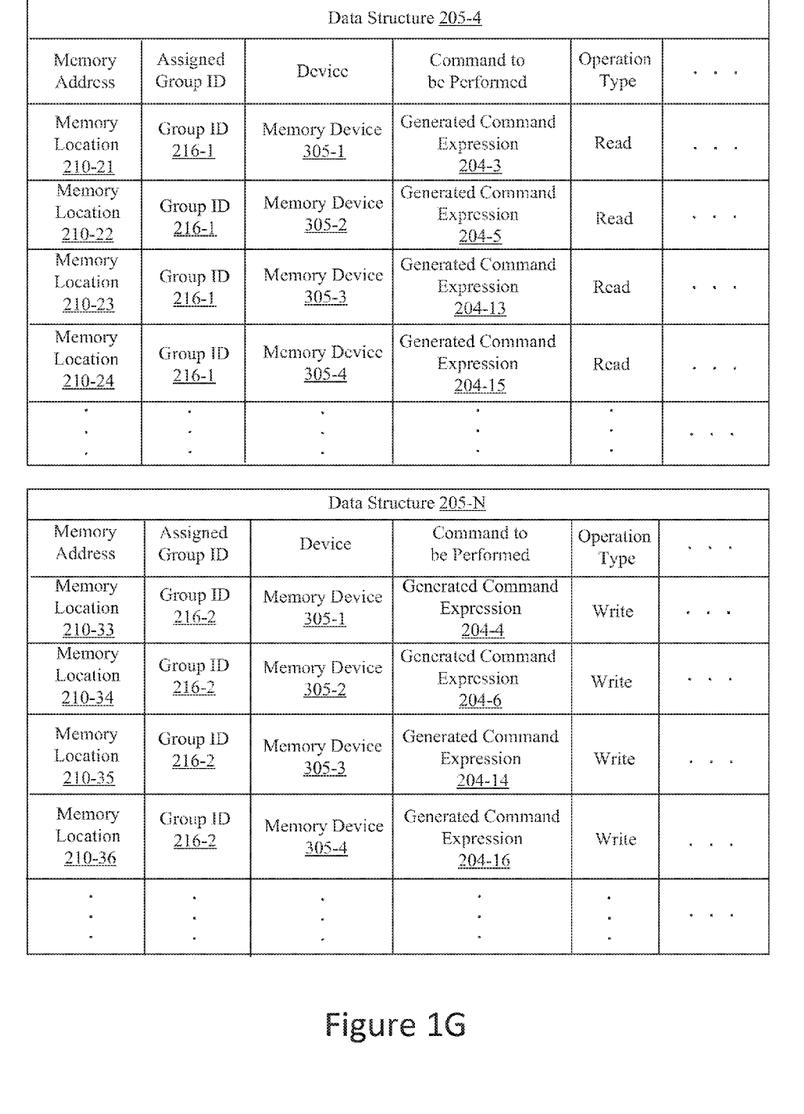
FIG. 1G depicts a separate data structure scheme for storing newly generated input/output command expressions for grouped execution in accordance with embodiments of the present invention.

FIG. 1G depicts a separate data structure scheme for storing newly generated input/output command expressions for grouped execution in accordance with embodiments of the present invention. Accordingly, with reference to the embodiment depicted in FIG. 1G, command grouping module 206-1 arranges the command group for "read" commands, such as command group 216-1, to be stored in a manner such that generated command expressions 204-3, 204-5, 204-13, and 204-15 are stored in a single data structure, such as data structure 205-4. Additionally, command grouping module 206-1 simultaneously arranges the command group for "write" commands, such as command group 216-2, to be stored in a manner such that generated command expressions 204-4, 204-6, 204-14, and 204-16 are stored in a single data structure, such as data structure 205-N. As such, data structures 205-4 and 205-N include the functionality to be separate data structures configured to store different types of command groups.

With further reference to the embodiment depicted in FIG. 1D, input/output expression generation module 204 submits control signals related to the arrangement of command groups generated by command grouping module 206-1 to input/output command execution module 208 for further processing. Command execution module 208 includes the functionality to receive a control signal from input/output expression generation module 204 to begin processing generated command expressions stored in data structures generated by data structure generation module 205. Accordingly, in some embodiments, command execution module 208 is hardware capable of processing generated command expressions produced by input/output expression generation module 204.

Figure 2A:
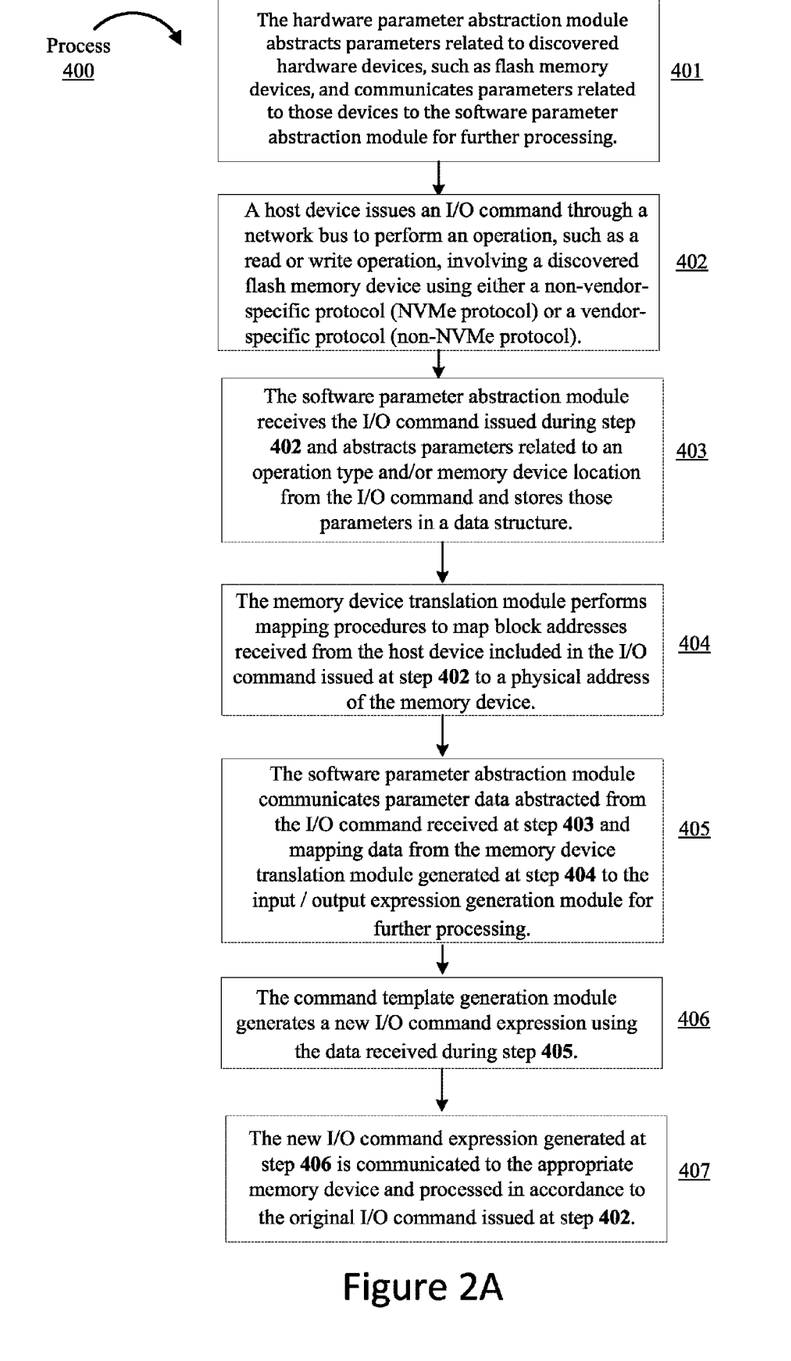
FIG. 2A is a flowchart of an exemplary process for executing input/output commands expressed in different protocols using a single common format in accordance with embodiments of the present invention.

FIG. 2A is a flowchart of an exemplary process for executing input/output commands expressed in different protocols using a single common format in accordance with embodiments of the present invention.

At step 401 the hardware parameter abstraction module abstracts parameters related to discovered hardware devices, such as flash memory devices, and communicates parameters related to those devices to the software parameter abstraction module for further processing.

At step 402, a host device issues an I/O command through a network bus to perform an operation, such as a read or write operation, involving a discovered flash memory device using either a non-vendor-specific protocol (NVMe protocol) or a vendor-specific protocol (non-NVMe protocol).

At step 403, the software parameter abstraction module receives the I/O command issued during step 402 and abstracts parameters related to an operation type and/or memory device location from the I/O command and stores those parameters in a data structure.

At step 404, the memory device translation module performs mapping procedures to map block addresses received from the host device included in the I/O command issued at step 402 to a physical address of the memory device.

At step 405, the software parameter abstraction module communicates parameter data abstracted from the I/O command received at step 403 and mapping data from the memory device translation module generated at step 404 to the input/output expression generation module for further processing.

At step 406, the command template generation module generates a new I/O command expression using the data received during step 405. The generated command expression created by the command template generation module expresses the I/O command issued at step 402 in a single common format that allows both vendor-specific protocols (or non-NVMe formatted commands) and standardized formats (or NVMe formatted commands) to be harmonized and processed by all devices discovered at step 401.

At step 407, the new I/O command expression generated at step 406 is communicated to the appropriate memory device and processed in accordance with the original I/O command issued at step 402.

Figure 2B:
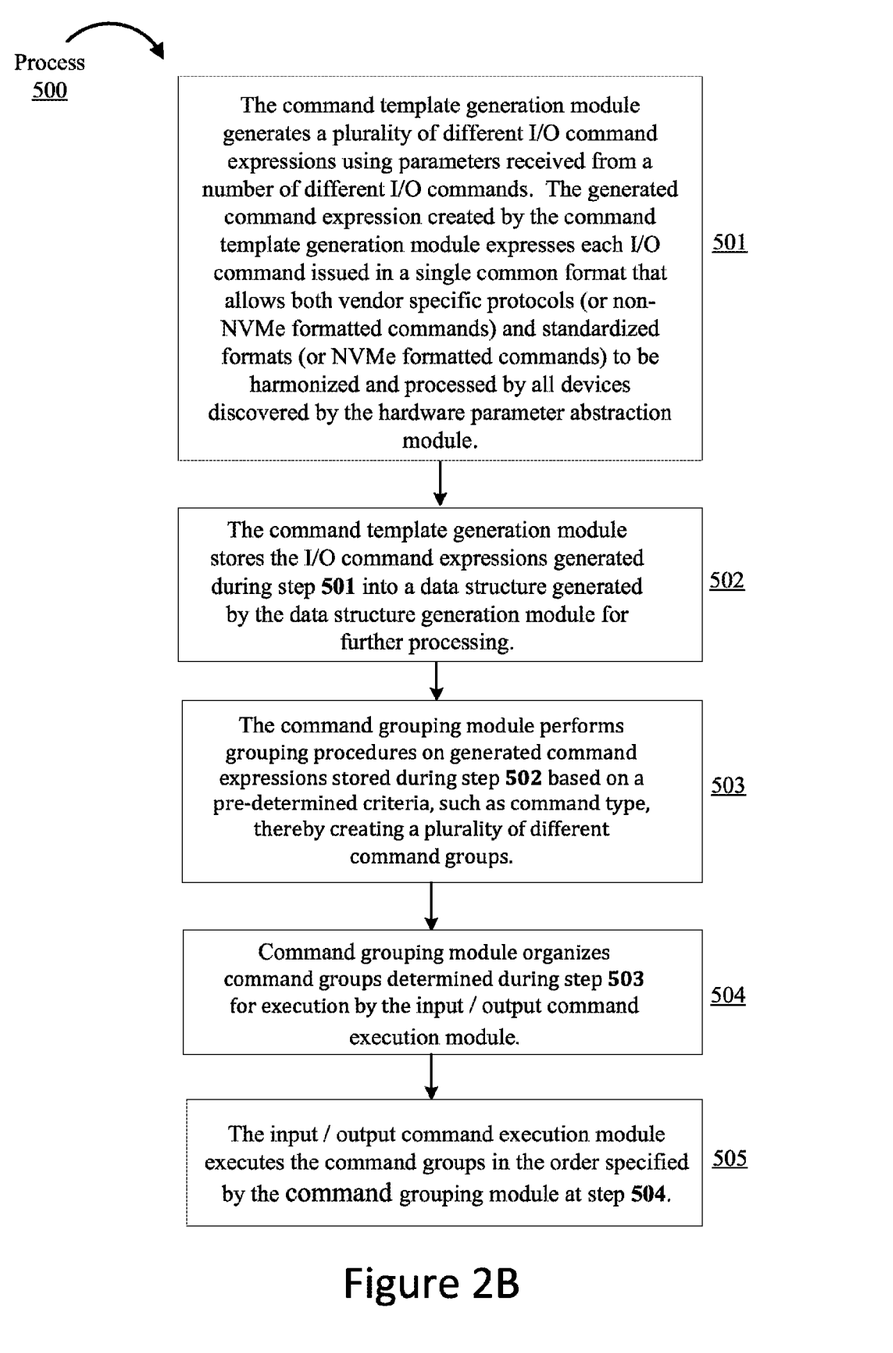
FIG. 2B is a flowchart of an exemplary process for grouped execution of input/output commands expressed in different protocols using a single common format in accordance with embodiments of the present invention.

FIG. 2B is a flowchart of an exemplary process for grouped execution of input/output commands expressed in different protocols using a single common format in accordance with embodiments of the present invention.

At step 501, the command template generation module generates a plurality of different I/O command expressions using parameters received from a number of different I/O commands. The generated command expression created by the command template generation module expresses each I/O command issued in a single common format that allows both vendor specific protocols (or non-NVMe formatted commands) and standardized formats (or NVMe formatted commands) to be harmonized and processed by all devices discovered by the hardware parameter abstraction module.

At step 502, the command template generation module stores the I/O command expressions generated during step 501 into a data structure generated by the data structure generation module for further processing.

At step 503, the command grouping module performs grouping procedures on generated command expressions stored during step 502 based on a predetermined criteria, such as command type, thereby creating a plurality of different command groups.

At step 504, the command grouping module organizes command groups determined during step 503 based on predetermined logic.

At step 505, the input/output command execution module executes the command groups in the order specified by the command grouping module at step 504.

Although exemplary embodiments of the present disclosure are described above with reference to the accompanying drawings, those skilled in the art will understand that the present disclosure may be implemented in various ways without changing the necessary features or the spirit of the present disclosure. The scope of the present disclosure will be interpreted by the claims below, and it will be construed that all techniques within the scope equivalent thereto belong to the scope of the present disclosure.

According to an embodiment, the techniques described herein are implemented by one or more special-purpose computing devices. The special-purpose computing devices may be hardwired to perform the techniques; may include digital electronic devices, such as one or more application-specific integrated circuits (ASICs) or field programmable gate arrays (FPGAs) that are persistently programmed to perform the techniques; or may include one or more general purpose hardware processors programmed to perform the techniques pursuant to program instructions in firmware, memory, other storage, or a combination. Such special-purpose computing devices may also combine custom hardwired logic. ASICs, or FPGAs with custom programming to accomplish the techniques. The special-purpose computing devices may be database servers, storage devices, desktop computer systems, portable computer systems, handheld devices, networking devices, or any other device that incorporates hardwired and/or program logic to implement the techniques.

In the foregoing detailed description of embodiments of the present invention, numerous specific details have been set forth in order to provide a thorough understanding of the present invention. However, it will be recognized by one of ordinary skill in the art that the present invention is able to be practiced without these specific details. In other instances, well-known methods, procedures, components, and circuits have not been described in detail so as not to unnecessarily obscure aspects of the embodiments of the present invention.

Although a method is able to be depicted as a sequence of numbered steps for clarity, the numbering does not necessarily dictate the order of the steps. It should be understood that some of the steps may be skipped, performed in parallel, or performed without the requirement of maintaining a strict order of sequence. The drawings showing embodiments of the invention are semi-diagrammatic and not to scale and, particularly, some of the dimensions are for the clarity of presentation and are shown exaggerated in the Figures. Similarly, although the views in the drawings for the ease of description generally show similar orientations, this depiction in the Figures is arbitrary for the most part.

Embodiments according to the present disclosure are thus described. While the present disclosure has been described in particular embodiments, it is intended that the invention shall be limited only to the extent required by the appended claims and the rules and principles of applicable law.

What is claimed is:

1. A method of executing I/O commands, said method comprising:
   receiving a first I/O command expressed in a first protocol for executing a first set of operations using a plurality of memory devices;
   receiving a second I/O command expressed in a second protocol different from the first protocol for executing a second set of operations using said plurality of memory devices;
   normalizing said first and second I/O commands into a common format by identifying common parameters to generate a plurality of normalized commands; and
   grouping said plurality of normalized commands for executing said first and second set of operations on said plurality of memory devices.

2. The method of executing I/O commands as described in claim 1, wherein said normalizing further comprises:
   extracting a first set of I/O parameters related to said first I/O command and a second set of I/O parameters related to said second I/O command; and
   generating said plurality of normalized commands using said first and second sets of I/O parameters and a template.

3. The method of executing I/O commands as described in claim 1, further comprising:
   generating a respective data structure for storing each of said first and second sets of operations separately.

4. The method of executing I/O commands as described in claim 1, wherein said grouping further comprises:
   grouping said plurality of normalized commands based on a predetermined criteria.

5. The method of executing I/O commands as described in claim 4, wherein said predetermined criteria comprises an operation type.

6. The method of executing I/O commands as described in claim 1, further comprising:
   executing said plurality of normalized commands in parallel.

7. The method of executing I/O commands as described in claim 1, wherein said different protocols comprises:
   a vendor-independent standard; and
   a vendor-specific standard.

8. A system for executing I/O commands, said system comprising:
   a receiving module configured to receive a first I/O command expressed in a first protocol for executing a first set of operations using a plurality of memory devices and receiving a second I/O command expressed in a second protocol different from the first protocol for executing a second set of operations using said plurality of memory devices;
   a normalization module configured to normalize said first and second I/O commands into a common format by identifying common parameters to generate a plurality of normalized commands; and
   a grouping module configured to group said plurality of normalized commands for executing said first and second set of operations on said plurality of memory devices.

9. The system for executing I/O commands as described in claim 8, wherein said normalization module is further operable to extract a first set of I/O parameters related to said first I/O command and a second set of I/O parameters related to said second I/O command and generate said plurality of normalized commands using said first and second sets of I/O parameters and a template.

10. The system for executing I/O commands as described in claim 8, further comprising:
    a data structure generation module configured to generate a respective data structure for storing each of said first and second sets of operations separately.

11. The system for executing I/O commands as described in claim 10, wherein said grouping module is further operable to group said plurality of normalized commands based on a predetermined criteria.

12. The system for executing I/O commands as described in claim 11, wherein said predetermined criteria comprises an operation type.

13. The system for executing I/O commands as described in claim 8, further comprising:
    an execution module configured to execute said plurality of normalized commands in parallel.

14. The system for executing I/O commands as described in claim 8, wherein said different protocols comprises:
    a vendor-independent standard; and
    a vendor-specific standard.

15. A method of executing I/O commands, said method comprising:
    receiving a first I/O command expressed in a first protocol for executing a first set of operations using a plurality of memory devices;
    receiving a second I/O command expressed in a second protocol different from the first protocol for executing a second set of operations using said plurality of memory devices;
    normalizing said first and second I/O commands into a common format by identifying common parameters to generate a plurality of normalized commands; and
    grouping said plurality of normalized commands for execution on said plurality of memory devices, wherein said plurality of normalized commands are stored in separate data structures based on a predetermined criteria.

16. The method of executing I/O commands as described in claim 15, wherein said normalizing further comprises:
    extracting a first set of I/O parameters related to said first I/O command and a second set of I/O parameters related to said second I/O command; and
    generating said plurality of normalized commands using said first and second sets of I/O parameters and a template.

17. The method of executing I/O commands as described in claim 15, wherein said different protocols comprises:
    a vendor-independent standard; and
    a vendor-specific standard.

18. The method of executing I/O commands as described in claim 17, wherein said predetermined criteria comprises an operation type.

19. The method of executing I/O commands as described in claim 18, wherein said operation type is a read or write operation.

20. The method of executing I/O commands as described in claim 18, wherein said operation type is a data integrity check operation.

* * * * *